US009794872B2

(12) United States Patent
Van Lieshout et al.

(10) Patent No.: US 9,794,872 B2
(45) Date of Patent: Oct. 17, 2017

(54) METHOD AND SYSTEM FOR MINIMIZING POWER CONSUMPTION OF USER EQUIPMENT DURING CELL DETECTION

(71) Applicant: Samsung Electronics Co., Ltd., Gyeonggi-do (KR)

(72) Inventors: Gert-Jan Van Lieshout, Middlesex (GB); Satish Nanjunda Swamy Jamadagni, Bangalore (IN); Mangesh Abhimanyu Ingale, Bangalore (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 25 days.

(21) Appl. No.: 14/383,894

(22) PCT Filed: Mar. 6, 2013

(86) PCT No.: PCT/KR2013/001812
§ 371 (c)(1),
(2) Date: Sep. 8, 2014

(87) PCT Pub. No.: WO2013/133630
PCT Pub. Date: Sep. 12, 2013

(65) Prior Publication Data
US 2015/0139053 A1 May 21, 2015

(30) Foreign Application Priority Data
Mar. 6, 2012 (IN) .............................. 849/CHE/2012

(51) Int. Cl.
*H04W 52/02* (2009.01)
*H04W 36/00* (2009.01)
(Continued)

(52) U.S. Cl.
CPC ... *H04W 52/0209* (2013.01); *H04W 36/0094* (2013.01); *H04W 48/16* (2013.01);
(Continued)

(58) Field of Classification Search
None
See application file for complete search history.

(56) References Cited

U.S. PATENT DOCUMENTS 6,681,112 B1  1/2004 Schwarz et al.
6,845,238 B1  1/2005 Muller
(Continued)

FOREIGN PATENT DOCUMENTS

CN  201226599 Y  4/2009
CN  101690359 A  3/2010
(Continued)

OTHER PUBLICATIONS

Extended European Search Report dated Nov. 3, 2015 in connection with European Patent Application No. 13757494.3, 5 pages.
(Continued)

*Primary Examiner* — Min Jung (57) ABSTRACT

A method and system for minimizing battery power consumption of user equipment (UE) during inter-frequency cell discovery in heterogeneous network is disclosed. UE receives background scan configuration for specified frequency from the network and performs the background scan for detecting inter-frequency cell. The UE detects an inter-frequency cell on the frequency indicated in the background scan configuration, during the inactive time of DRX cycle. Further, UE indicates the physical cell identity of the detected cell to the network. Then the UE activates the normal measurement gap provided previously or the network configures normal measurement gap to the UE if not provided previously. Further, UE performs Reference signal Received Power (RSRP) and Reference Signal Received Quality (RSRQ) measurements of the detected cell. Then the UE reports these measurements to the network when the
(Continued)

measurement report event condition is satisfied and the network handovers the UE to the detected cell.

18 Claims, 2 Drawing Sheets

(51) Int. Cl.
    *H04W 48/16*     (2009.01)
    *H04W 76/04*     (2009.01)
    *H04W 36/14*     (2009.01)

(52) U.S. Cl.
    CPC ... *H04W 52/0216* (2013.01); *H04W 52/0229* (2013.01); *H04W 36/14* (2013.01); *H04W 76/048* (2013.01); *Y02B 60/50* (2013.01)

(56) References Cited

U.S. PATENT DOCUMENTS

| | | | |
|---|---|---|---|
| 7,720,438 B2 | 5/2010 | Rowse | |
| 2007/0004404 A1* | 1/2007 | Buckley | H04W 48/16 455/434 |
| 2007/0037594 A1 | 2/2007 | Palenius et al. | |
| 2007/0207815 A1* | 9/2007 | Alfano | H04W 48/04 455/456.1 |
| 2009/0005029 A1 | 1/2009 | Wang et al. | |
| 2009/0080386 A1 | 3/2009 | Yavuz et al. | |
| 2010/0190488 A1 | 7/2010 | Jung et al. | |
| 2010/0273484 A1 | 10/2010 | Ishii | |
| 2010/0323633 A1 | 12/2010 | Pani et al. | |
| 2011/0105122 A1 | 5/2011 | Wu | |
| 2011/0176465 A1 | 7/2011 | Panta et al. | |
| 2012/0115527 A1* | 5/2012 | Narasimha | H04W 24/10 455/513 |
| 2012/0252452 A1* | 10/2012 | Martin | H04W 48/20 455/436 |
| 2012/0252487 A1* | 10/2012 | Siomina | H04W 24/10 455/456.1 |
| 2013/0084849 A1* | 4/2013 | Koskinen | H04W 36/0088 455/422.1 |
| 2013/0088985 A1* | 4/2013 | Park | H04W 48/16 370/252 |
| 2013/0170418 A1* | 7/2013 | Stauffer | H04W 52/0229 370/311 |
| 2014/0112180 A1* | 4/2014 | Axmon | H04W 24/10 370/252 |

FOREIGN PATENT DOCUMENTS

| | | |
|---|---|---|
| JP | 2010541332 A | 12/2010 |
| WO | WO 2007/072193 A2 | 6/2007 |
| WO | 2009072521 A1 | 6/2009 |
| WO | 2010148290 A1 | 12/2010 |

OTHER PUBLICATIONS

International Search Report dated Apr. 25, 2013 in connection with International Patent Application No. PCT/KR2013/001812, 3 pages.
Written Opinion of International Searching Authority dated Apr. 25, 2013 in connection with International Patent Application No. PCT/KR2013/001812, 4 pages.
Foreign Communication From a Related Counterpart Application, Japanese Application No. 2014-560853, Notice of Allowance dated Jan. 23, 2017, 6 pages.
Foreign Communication from Related Counterpart Application, Chinese Patent Application No. 201380012892.0, First Chinese Office Action dated May 18, 2017, 22 pages.

\* cited by examiner

METHOD AND SYSTEM FOR MINIMIZING POWER CONSUMPTION OF USER EQUIPMENT DURING CELL DETECTION

CROSS-REFERENCE TO RELATED APPLICATION(S)

The present application claims priority under 35 U.S.C. §365 to International Patent Application No. PCT/KR2013/001812 filed Mar. 6, 2013, entitled "A METHOD And SYSTEM FOR MINIMIZING POWER CONSUMPTION OF USER EQUIPMENT DURING CELL DETECTION". International Patent Application No. PCT/KR2013/001812 claims priority under 35 U.S.C. §365 and/or 35 U.S.C. §119(a) to Indian Patent Application No. 849/CHE/20123 filed Mar. 6, 2013 and which are incorporated herein by reference into the present disclosure as if fully set forth herein.

TECHNICAL FIELD

The present invention relates to heterogeneous networks and more particularly relates to a method and system for minimizing the battery power consumption of User Equipment (UE) during inter-frequency pico cell discovery in heterogeneous network deployments.

BACKGROUND ART

In a wireless communication system, ubiquitous coverage is the prime requirement for a cellular operator. The wireless communication system primarily includes a homogenous and heterogeneous deployment of cells. In a homogeneous deployment, there will be uniform cell size or coverage area, whereas in case of a heterogeneous network the cell sizes vary according to the deployment of different types of cells. A heterogeneous deployment topology comprises mixed cells served by high power macro eNodeBs (eNBs) and low power pico or femto eNBs or relay nodes within a geographical area.

In the LTE system, an evolved universal terrestrial radio access network (E-UTRAN) includes a plurality of evolved Node-Bs (eNBs) and communicates with a plurality of mobile stations, also referred as User Equipments (UEs).

In the LTE system, the user equipment (UE) may perform measurements to measure radio link quality, such as quality of a frequency channel or strength of a radio signal, in order to facilitate handover due to mobility of the UE. The measurement can be divided into two types according to the current operating frequency of the UE, which are an intra-frequency measurement and an inter-frequency/inter-RAT measurement.

The intra-frequency measurement is predominantly performed for the mobility within the same frequency channel (between cells operating on the same carrier frequency); whereas the inter-frequency/inter-Radio Access Technology (RAT) measurement is predominantly performed for the mobility between different frequency channels (i.e. between cells operating on different carrier frequencies).

In addition, the inter-frequency/inter-RAT measurement is performed during measurement gap configured by the network. Further, during the measurement gap, both the uplink and downlink transmissions are suspended (for example, no Physical Uplink Control Channel (PUCCH), physical uplink shared channel (PUSCH), physical downlink control channel (PDCCH), and physical downlink shared channel (PDSCH) transmissions), and thereby the inter-frequency/inter-RAT measurement can be performed within the measurement gap.

Inter-frequency neighbor cell search (measurement) is performed within a gap length of 6 ms in LTE for both Time Domain Duplex (TDD) and Frequency Domain Duplex (FDD) systems. However, some time is required for switching between the frequency of serving cell and the frequency on which a new cell need to be detected. The remaining time of the gap (slightly less than 6 ms) can be utilized for neighbor cell search on one or more configured frequencies, other than the serving frequency. Hence within one gap duration, the actual time for neighbor cell search will be less than 6 ms.

The inter-frequency heterogeneous network deployment may be asynchronous such that radio frame timing of one cell is not aligned with that of the other neighbor cell(s). The measurement gap is standardized in the LTE specification (TS 36.331) and has a periodicity of either 40 ms or 80 ms.

Operators for maximizing offloading opportunity, typically configure a continuous scanning of pico cell frequencies for any possible offloading opportunity. This enormously increases the amount of time that UEs spend in a scan mode.

Further, in a heterogeneous network scenario where small cells are deployed for the purpose of offloading users from macro cell, the constant use of inter-frequency measurements using the current standardized measurement gap patterns and measurement rules will drain the UE battery rapidly. The battery drain is proportional to the Pico cell deployment density within the macro cells.

The currently defined gap pattern was originally designed for mobility purposes within a macro cell only deployment scenario which was quite sparse when compared to the heterogeneous deployments. The measurement gap is designed and optimized for allowing fast inter-frequency/RAT cell search and enabling fast mobility, when needed in a macro cell only deployment scenario. Furthermore, in a macro only network the use of inter-frequency measurements is done when needed by network either for offloading traffic to a different frequency layer or due to mobility reasons.

DISCLOSURE OF INVENTION

Technical Problem

In the light of above discussion, it is desirable to have a method and system that provides a mechanism for minimizing the battery power consumption of UE during the inter-frequency cell discovery but at the same time not compromising any possible offloading opportunity in heterogeneous network deployments.

Solution to Problem

The principal object of the embodiments herein is to provide a method and system for minimizing battery power consumption of user equipment during inter-frequency cell detection under dense wireless cell deployment scenarios.

Another object of the invention is to provide a method and system for detecting inter-frequency cell detection by the user equipment in an inactive time of discontinuous reception cycle.

Accordingly the invention provides a method for minimizing battery power consumption of user equipment (UE) in Radio Resource Control (RRC) connected mode during inter-frequency cell detection in a heterogeneous network, wherein the method comprises deciding to send background scan configuration to the UE based on cell density by the network. The method comprises receiving the background scan configuration for at least one configured frequency by the UE to initiate a cell search on the configured frequency during inactive time of Discontinuous Reception (DRX) cycle, wherein said configured frequency is a frequency other than a serving frequency. Then the method detects the at least one cell on the configured frequency using the background scan configuration. Further the method indicates physical cell identity (PCI) of the at least one detected cell on the configured frequency by the UE to the network. Further, the method comprises activating a normal measurement gap when the UE is configured with the normal measurement gap previously by the network.

Accordingly the invention provides a network for minimizing battery power consumption of user equipment (UE) in Radio Resource Control (RRC) connected mode during inter-frequency cell detection in a heterogeneous network, wherein the network is configured to decide for sending background scan configuration to the UE based on cell density. The network is configured to provide the background scan configuration for at least one configured frequency for the UE to initiate a cell search on the configured frequency during inactive time of Discontinuous Reception (DRX) cycle, wherein the configured frequency is a frequency other than a serving frequency. Further the network is configured to receive physical cell identity (PCI) of at least one detected cell from the UE on the configured frequency configured for background scan. The network is configured to reconfigure the UE with a normal measurement gap if not provided previously in a measurement configuration. Further the network is configured to send measurement report event condition for at least one configured frequency, upon receiving PCI of at least one detected cell by the UE on the configured frequency configured for background scan. Finally, the network is configured to perform a handover of the UE to the detected cell on the configured frequency based on satisfaction of measurement report event condition.

Accordingly the invention provides a user equipment (UE) for inter-frequency cell detection in Radio Resource Control (RRC) connected mode in a heterogeneous network, wherein the UE comprises an integrated circuit. Further the integrated circuit comprises at least one processor, at least one memory. The memory further comprises a computer program code within the circuit. At least one memory and the computer program code with the at least one processor cause the UE to receive a background scan configuration for at least one configured frequency from the network to initiate a cell search on the configured frequency during inactive time of Discontinuous Reception (DRX) cycle, wherein the configured frequency is a frequency other than a serving frequency. Further the UE is configured to detect the at least one cell on the configured frequency using the background scan configuration. Then the UE is configured to indicate physical cell identity (PCI) of the at least one detected cell on the configured frequency to the network. Further the UE is configured to activate a normal measurement gap if configured previously by the network, receive the normal measurement gap if not configured previously. Finally, UE is configured to send measurement report event condition for the configured frequency from the network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

BEST MODE FOR CARRYING OUT THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for minimizing the battery power consumption of user equipment (UE) in Radio Resource Control (RRC) connected mode during the inter-frequency pico cell discovery in heterogeneous network deployments. The UE receives a background scan configuration for a specified frequency from the network and the UE performs a background scan on the specified frequency for detecting the inter-frequency cell.

Throughout the description the terms network and a heterogeneous network consisting of macro cells and pico cells are used interchangeably.

In an embodiment, the background scan configuration comprises background scan indicator, periodicity of scan, density of cells on a frequency and list of frequencies for background scans.

Normally, the network configures the UE for performing inter-frequency measurements using a measurement configuration. The measurement configuration includes the measurement object per frequency, the reporting configuration, measurement identities and measurement gap configuration. Through the background scan configuration, the network indicates for which configured frequency the UE is expected to perform cell search on that frequency using background scan method, according to the measurement configuration (measurement object). Upon reception of the background scan indication, the UE detects an inter-frequency cell on the frequency indicated by the network in the background scan configuration. Upon detecting the cell during background scan mode, the UE indicates the physical cell identity of the detected cell to the network. Then the network configures a normal measurement gap to the UE if already not provided in the measurement configuration. Otherwise the UE stops the background scan and applies the measurement gap provided earlier in the measurement configuration for performing normal measurements. The configuration of the normal measurement for UEs which have been configured for background scan can be either triggered by the detection or reporting of a small cell to the network.

In an embodiment, the configuration of the normal measurement can be triggered by a network decision based on the pico cell density in a geographic area.

Further, the UE performs Reference signal Received Power (RSRP) and Reference Signal Received Quality (RSRQ) measurements of the detected cell on other frequency by applying the normal measurement gap. Then the UE reports these measurements to the network when the measurement report event condition is satisfied. Finally the network handovers the UE to the detected cell, when the measurements of RSRP and RSRQ are satisfied.

Referring now to the drawings, and more particularly to FIGS. 1 through 5, where similar reference characters denote corresponding features consistently throughout the figures, there are shown preferred embodiments.

Figure 1:
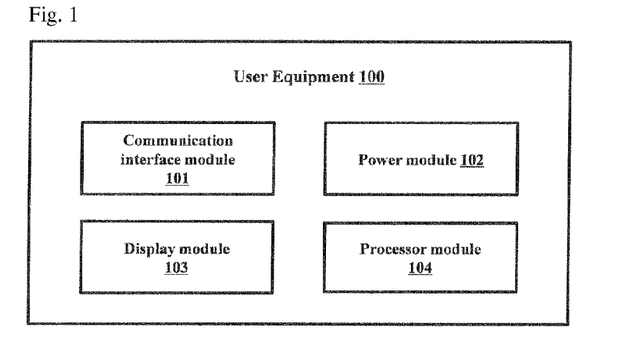
FIG. 1 illustrates the block diagram of a user equipment with various modules, according to embodiments as disclosed herein.

FIG. 1 illustrates the block diagram of user equipment with various modules, according to embodiments as disclosed herein. As depicted in the figure, the user equipment 100 comprises a communication interface module 101, a power module 102, a display module 103 and a processor module 104. The communication interface module 101 helps the UE to connect to the access network. The power module 102 holds the battery information and status of battery power in the user equipment 100. The battery information comprises the amount of charge that the device possess and the time period for which the user equipment 100 will be in operation and so on. The display module 103 of the user equipment 100 may comprise of a user interface which can be a key pad or through any other means by which a user can input some data into the user equipment 100. The processor module 104 provides the processing, I/O scanning, logic, control and communication functions in the user device 100. The processor module is configured in such way that the UE 100 detects the inter-frequency pico cell in heterogeneous networks by minimizing the battery power consumption of the UE 100. The background scan configuration provided by the network is executed by the UE in the processor module 104.

Figure 2:
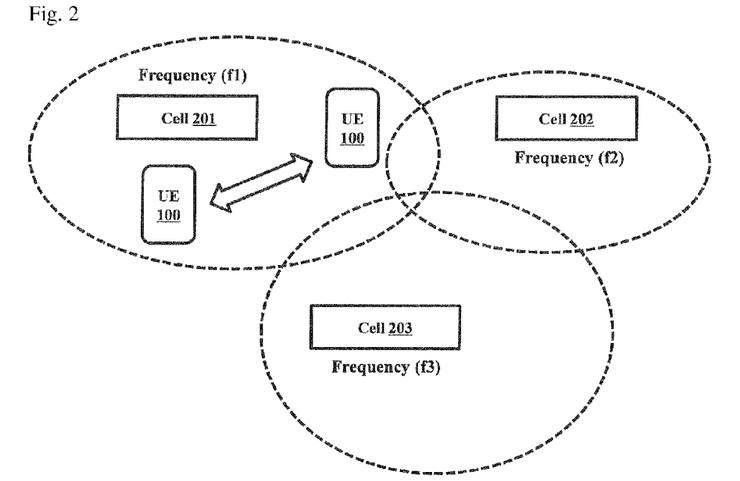
FIG. 2 illustrates an exemplary scenario of inter-frequency measurements by a user equipment in the existing art.

FIG. 2 illustrates an exemplary scenario of inter-frequency measurements by user equipment in the existing art. As depicted in the figure, the UE 100 is being served by the cell 201 on frequency f1. When the UE is moving away from the coverage of cell 201, the UE 100 detects the cell 202 on frequency f2 and measures the signal strength of cell 202 to initiate handover procedure. The cells 201, 202 and 203 are being operated on different frequencies namely f1, f2 and f3 respectively. Normally, the network configures the UE for performing inter-frequency measurements with the measurement configuration to facilitate handover.

A cell search is performed when a UE 100 is switched on (initial cell search) and also during idle and connected (active) modes (neighbor cell search). The neighbor cell search (measurement) also called as target cell search (measurement) are performed periodically in order to find a candidate cell with best signal strength either for handover or cell re-selection. The candidate cells in LTE systems can be intra-frequency or inter-frequency cells.

Further, in FIG. 2 the cells (201, 202 and 203) depict the homogeneous deployment scenario (macro only network), the measurement rules based on s-measure triggers the inter-frequency measurement appropriately because the UE 100 starts inter-frequency measurements, when the signal strength from the serving cell 101 falls below the threshold specified by s-measure. The UE 100 performs the cell search in the measurement gap of 6 ms for every 40 ms or 80 ms according to the measurement gap pattern configured in the measurement configuration. In the macro only network, there will not be significant impact on the battery power consumption of UE 100 because the applicability of the configured measurement gap pattern is governed by the s-measure. This means the UE battery power consumption during measurement gap occurs only when required for mobility purpose.

Figure 3:
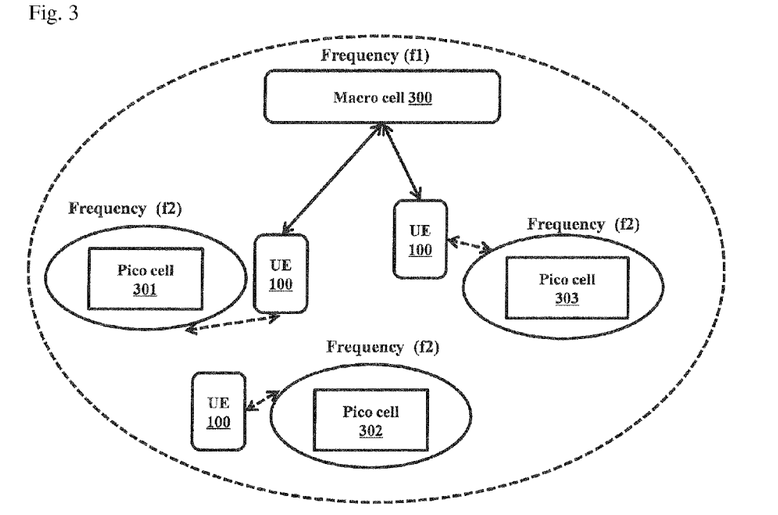
FIG. 3 illustrates the inter-frequency pico cell detection by the user equipment using background scan configuration, according to the embodiments as disclosed herein.

FIG. 3 shows the deployment of inter-frequency pico cells within the coverage of macro cell depicting heterogeneous network deployment. As depicted in the figure, the inter-frequency pico cells are deployed within the coverage of macro cell (300) operating on frequency f1. The pico cells 301, 302 and 303 are operating on another frequency f2 different from the frequency of operation of macro cell. The pico frequency layer f2 may be used for offloading the macro cell 300 especially in densely populated areas.

Presently, the 3rd Generation Partnership Project (3GPP) is studying enhancements in heterogeneous network deployments and one of the important issue is to identify and evaluate strategies for improved small cell discovery and identification. The deployment of small cells (pico cells) may be done for various reasons such as obtaining network densification and thereby obtain greater user capacity handling, the support of HeNBs, the deployment of hot spots for offloading, enterprise deployments and so on. The inter-frequency measurement by the UE 100 and the network density which is the number of cells deployed in a given area has an impact on its power consumption (energy used only for the purpose of small cell detection).

Further, it is also known that, if the currently available measurement gap pattern (6 ms gap every 40 or 80 ms) is used for inter-frequency pico cell detection, the impact on the UE power consumption is significant (and negative) even when having a relatively large amount of small cells deployed. The currently defined measurement gap pattern was originally designed for mobility purposes and this measurement gap was designed and optimized for allowing fast inter-frequency or Radio Access Technology (RAT) cell search and measurement enabling fast mobility when needed in a macro cell only deployment scenario.

In a HetNet scenario (shown in the figure), where small cells are deployed as hotspots for the purpose of offloading users from macro cell 300 (capacity scenario) the constant use of inter-frequency measurements using the current standardized measurement gap patterns and measurement rules will drain the UE battery rapidly.

A method for minimizing battery power consumption of user equipment (UE) in Radio Resource Control (RRC) connected mode during inter-frequency cell detection in a heterogeneous network is described herein.

In one embodiment, as depicted in the figure, the UE always have macro cell 300 coverage and the inter-frequency measurements towards pico cells need not be performed with the normal measurement gap periodicity of 40 ms or 80 ms.

For saving the battery power of the UE 100 for pico cell detection, the network or macro cell 300 can configure the UE 100 with a long periodicity measurement gap. In an example the long measurement gap can be of 10 seconds or 60 seconds. With this long periodicity measurement gap, the UE can save the battery power. Once the pico cell is detected by the UE 100, the network then configures the UE 100 with a normal measurement gap of 40 ms or 80 ms. However, increasing the measurement gap to 10 s or 60 s would require new measurement performance requirements for UE to be defined in the specification and it is the intention of this invention to address the issue.

The proposed invention addresses the above limitation by providing the long periodicity measurement in a background scan configuration by the network or macro cell 300. The UE 100 receives a background scan configuration that includes long periodicity measurement for detecting the inter-frequency pico cell in the heterogeneous network.

In an embodiment, the background scan configuration comprises background scan indicator which indicates to the UE 100 that it can perform the background scan in the inactive time of the configured discontinuous reception (DRX) cycle for detecting the inter-frequency pico cell. Through the background scan configuration, the network indicates for which configured frequency the UE is expected to perform cell search on that frequency using background scan method, according to measurement configuration (measurement object). The background scan configuration further comprises periodicity of scan, density of cells on a frequency and list of frequencies for background scan by the UE 100.

In an embodiment, the background scan configuration is provided to the UE in a broadcast message or a Radio Resource Control (RRC) reconfiguration message.

In an embodiment, the network sends a background scan indicator in the broadcast message so that the UE 100 starts the background scan for inter-frequency pico cell discovery during the inactive time of the configured DRX cycle. The broadcast indication acts as a trigger to request the UE 100 to initiate a cell search on the frequencies according to measurement configuration, other than the serving cell frequency.

The broadcast message triggers the UE 100 to initiate a cell search in the frequencies specified by the network according to measurement configuration. Further, the indication to trigger background scan in the broadcast message can be applicable for all the UEs in that cell or network.

In another embodiment, the network triggers the individual UEs to initiate the background scan by a "start scan" indication in a dedicated message so that the UE 100 starts the background scan for inter-frequency pico cell discovery during the inactive time of the configured DRX cycle. In one embodiment, such a message can be the RRC Connection Reconfiguration message. In this option the network can send the "start scan indicator" i.e. background scan indicator in the RRC connection reconfiguration message, along with the scan periodicity and the frequency list where the pico cells can be found.

In an embodiment, the periodicity of such inter-frequency measurements can be decided by the UE 100 itself.

In an embodiment, the periodicity of such inter-frequency measurements can be decided by the network and can be indicated to the UE 100 in the broadcast message or dedicated RRC message.

For example, the periodicity of inter-frequency measurement can be once for every 10 seconds or once in a minute.

In an embodiment, the list of frequencies indicate frequency layers of cell deployment based on the Radio Access Technology (RAT) belonging to 3rd Generation Partnership Project (3GPP) RAT and non 3GPP RAT.

In an embodiment, the indication (i.e. background scan indicator) to trigger background inter-frequency measurements can have several code-points corresponding to the RAT of the pico cell.

In an embodiment, the UE 100 can deduce the periodicity of the inter-frequency pico cell or inter-RAT measurement based on the code-point in the background scan indicator.

The periodicity of the inter-frequency pico cell or inter-RAT cell search is dependent on the density of pico cells.

In an embodiment, the network indicates the pico density in the broadcast message or dedicated RRC message, through which the UE 100 can deduce the periodicity of the scan based on the pico density indicated by the network.

The scan periodicity and the pico density can be indicated by the network in the broadcast message.

In an embodiment, the scan periodicity and the pico density can be provided by the network in the System Information Block 4 (SIB4) message.

In an embodiment, the network also indicates the frequencies on which the pico cells are deployed. In an embodiment the network indicates different Radio Access Technologies (RATs) on which the network wants the UEs to start a background scan.

In an embodiment, when the network has sent the background scan configuration to the UE to trigger inter-frequency/inter-RAT background scans (measurements), the UE performs the cell search (measurement) during the inactive time of configured DRX cycle. The UE 100 may take several inter-frequency scans for detecting the pico cell using the available inactive time opportunity during DRX cycle.

In an embodiment, when the inactive time during a particular DRX cycle is much longer (for example, few hundred ms), the UE 100 can detect the inter-frequency cell in a single scan instead of several scans.

Once the UE 100 has detected the inter-frequency or inter-RAT pico cell, the UE 100 reports the detected pico cell (i.e. physical cell identity of detected pico cell) to the network through a proximity indicator.

In an embodiment, the UE 100 indicates the detected cell on the frequency scanned using background scan configuration to the network through at least one of a proximity indication message, or a dedicated RRC message.

The UE 100 indicates to the network in the proximity indication message or the RRC message the Physical Cell Identity (PCI) of the detected cell on the frequency scanned using background scan configuration. Upon receiving the proximity indication message from the UE 100, the network configures the normal measurement gap of 40 ms or 80 ms to the UE if previously not provided in the measurement configuration. Otherwise, the UE 100 activates the normal measurement gap already configured by the network.

When the normal measurement gap is activated by the UE or received from the network, the UE 100 stops the background scan for inter-frequency measurements during the inactive time of DRX cycle.

In an embodiment, after sending the proximity indication to the network, the UE 100 starts a prohibit timer. If the normal inter-frequency measurement gap is not configured while the prohibit timer is running, the UE 100 continues the background scan and reports another proximity indication on expiry of prohibit timer, if the UE 100 is still in the proximity of inter-frequency pico cell.

When the already configured normal measurement gap is activated by the UE 100 or configured by the network upon reception of PCI of detected cell, the UE stops the background scan and the UE 100 performs a Reference signal Received Power (RSRP) and Reference Signal Received Quality (RSRQ) measurements of the detected cell using normal measurement gap. The UE 100 reports the RSRP/RSRQ measurements to the network when the measurement report event condition is satisfied and the UE 100 is handed over to the detected pico cell with normal handover procedure.

In an embodiment, the network determines whether the pico cell detected by the UE 100 is loaded through the X2 load information. Further, the network decides based on the load in the pico cell, whether to handover the UE to the detected pico cell or not.

The UE 100 is handed over to the detected pico cell (can be pico cell 301 or 302 or 303) by the network, as shown with the dotted arrows in the figure. In one embodiment, once the UE has handed over to a pico cell, that pico cell may reconfigure the UE for normal measurements.

Figure 4:
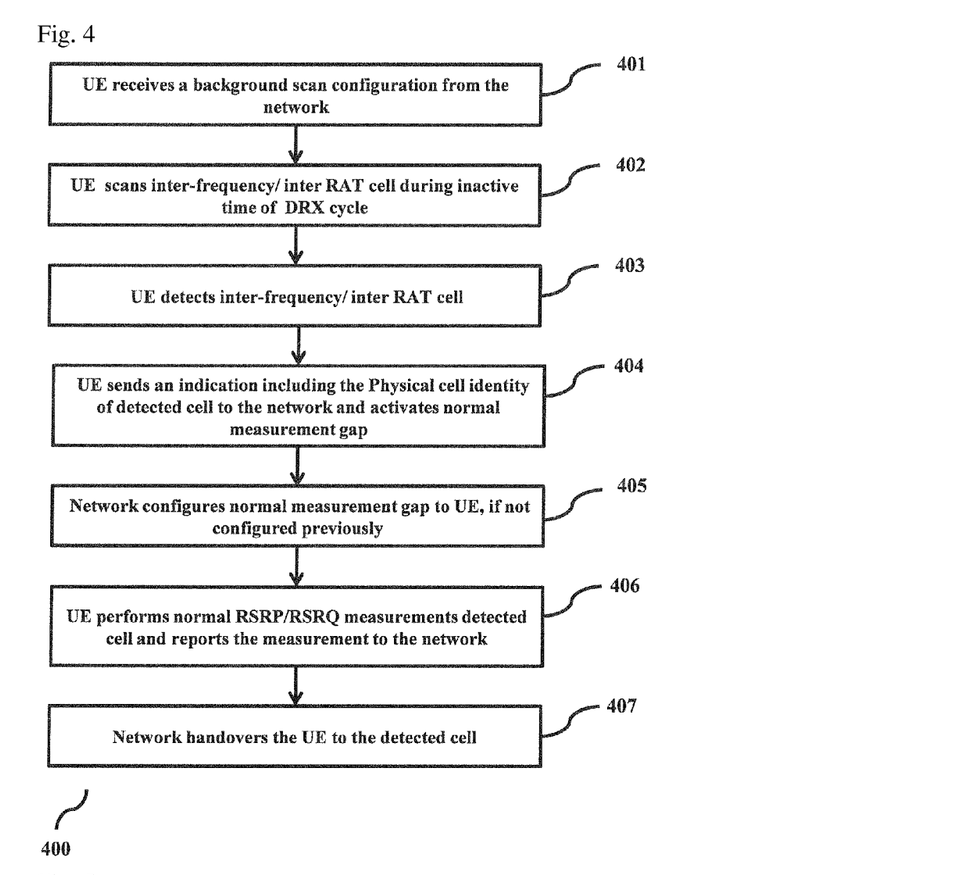
FIG. 4 illustrates a flow diagram explaining the process involved in detecting the inter-frequency cell by the user equipment, according to the embodiments as disclosed herein.

FIG. 4 illustrates a flow diagram explaining the process involved in detecting the inter-frequency cell by the user equipment using the background scan method, according to the embodiments as disclosed herein. As depicted in the flow diagram 400, initially the UE receives (401) a background scan configuration from the network or a macro cell.

In an embodiment, the background scan configuration is provided to the UE 100 in a broadcast message or a Radio Resource Control (RRC) reconfiguration message. The background scan configuration comprises background scan indicator indication which acts as a trigger to request the UE 100 to initiate a cell search on the frequencies according to measurement configuration, other than the serving cell frequency. The UE is expected to perform inter-frequency cell search during the inactive time of the configured DRX cycle.

The background scan configuration further comprises periodicity of scan, density of cells on a frequency layer and list of frequencies for background scan by the UE 100. The broadcast message or RRC reconfiguration message triggers the UE 100 to initiate a cell search or a scan in the frequencies specified by the network.

The UE performs (402) background scans for inter-frequency/inter RAT pico cell discovery during the inactive time of DRX cycle. According to the frequencies specified by the network for performing background scans, the UE 100 detects (403) inter-frequency or inter-RAT cell on the specified frequency. Once the UE 100 has detected the inter-frequency or inter-RAT cell, the UE 100 sends (404) an indication including the Physical Cell Identity (PCI) of the detected cell, to the network through a proximity indicator or a dedicated RRC message.

In an embodiment, the UE 100 indicates the detected cell on the frequency scanned using background scan configuration to the network through a proximity indication message, or a dedicated RRC message. The UE 100 indicates the Physical Cell Identity (PCI) of the detected pico cell to the network in the proximity indication message or the dedicated RRC message.

Further, the UE activates the normal measurement gap, if already provided in the measurement configuration. If the normal measurement gap was not configured previously, then the network configures (405) the normal measurement gap of 40 ms or 80 ms to the UE 100 upon reception PCI of the detected of the pico cell. The UE keeps using the measurement gap for inter-frequency measurements after the handover of the UE to the pico cell. With the normal measurement gap, the UE performs (406) the normal RSRP and RSRQ measurements of the detected cell. When the measurement report event condition is satisfied, the UE reports the RSRP/RSRQ measurements of the detected cell to the network. The network handovers (407) the UE 100 to the detected pico cell with the normal handover procedure. Further, the network may decide whether to handover the UE to the detected pico cell, based on the load in the pico cell. The various actions in flow diagram 400 may be performed in the order presented, in a different order or simultaneously. Further, in some embodiments, some actions listed in FIG. 4 may be omitted.

In an embodiment, the network can provide a UE with a set of rules based on indicated thresholds or preconfigured thresholds for the UE to decide on triggering a background scan.

In an embodiment, such rules can be a combination of the UE speed, location ID and so on.

In one embodiment, if the speed is "medium" and a location ID is a cell ID, then the UE will initiate a background scan on a provided frequency. Such rules can be indicated to the UE in a broadcast message or in a dedicated message.

When the UE is performing high data rate transmission/reception, it may not be configured with DRX. Then the network can configure the UE for relaxed measurements by configuring a new inter frequency measurement on that frequency with dedicated signaling. When the UE is in low throughput mode (may be even background data), the network can configure the UE for background scans for pico detection along with DRX configuration. When the DRX is not configured and relaxed measurement is configured then the rest of the steps can be the same, i.e. after the detection the UE shall send a proximity indicator and in turn the network shall configure the UE with a gap pattern for measuring the pico cell.

In another embodiment a simple new bit in the measurement configuration message or broadcast message indicating "delayed or relaxed detection allowed" could be sent to the UE to trigger relaxed scans (measurements) or a new event (s) which signal "delayed or relaxed detection allowed" could be sent to the UE for triggering the relaxed pico cell scans on specified frequency. Such an indication is sent to the UE as soon as the UE enters into a macro cell that has overlapping pico cells. The macro cell may be aware of the existence of the overlapping pico cells through any operation and Maintenance (OAM) entity.

In an embodiment, when UE 100 receives a relaxed detection allowed indication, it can mean that the minimum time that the UE should take for detecting a cell on a specified frequency is relaxed. In one example, such relaxation could be left to the UE implementation or the network could specify a relaxed detection time bound. In another example, a scaling factor or a code point can be provided by the network to specify the delay bound. As an example for scaling factor, the network can provide a value as 2X and leave the time value to be associated for the variable X to the UE or the network could also provide the X value. The value of X can also be a preconfigured minimum detection time which could be the same time as specified for normal detection.

Figure 5:
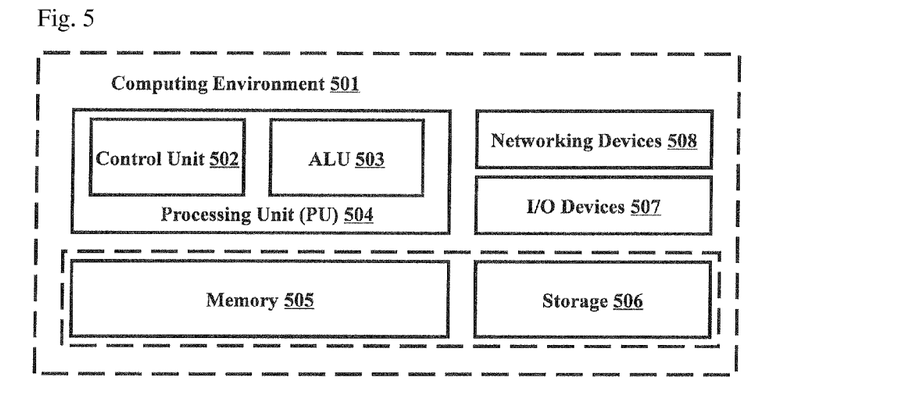
FIG. 5 illustrates a computing environment implementing the method and system for minimizing the battery power consumption in user equipment during inter-frequency cell detection, according to the embodiments as disclosed herein.

FIG. 5 illustrates a computing environment implementing the method and system for minimizing the battery power consumption in user equipment during inter-frequency cell detection, according to the embodiments as disclosed herein. As depicted the computing environment 501 comprises at least one processing unit 504 that is equipped with a control unit 502 and an Arithmetic Logic Unit (ALU) 503, a memory 505, a storage unit 506, plurality of networking devices 508 and a plurality Input output (I/O) devices 507. The processing unit 504 is responsible for processing the instructions of the algorithm. The processing unit 504 receives commands from the control unit in order to perform its processing. Further, any logical and arithmetic operations involved in the execution of the instructions are computed with the help of the ALU 503.

The overall computing environment 501 can be composed of multiple homogeneous and/or heterogeneous cores, multiple CPUs of different kinds, special media and other accelerators. The processing unit 504 is responsible for processing the instructions of the algorithm. Further, the plurality of processing units 504 may be located on a single chip or over multiple chips.

The algorithm comprising of instructions and codes required for the implementation are stored in either the memory unit 505 or the storage 506 or both. At the time of execution, the instructions may be fetched from the corresponding memory 505 and/or storage 506, and executed by the processing unit 504.

In case of any hardware implementations various networking devices 508 or external I/O devices 507 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1, 2, 3 and 5 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A node B in a communication network, the node B comprising:
    a transmitter configured to transmit, to a user equipment (UE), information for cell re-selection including an indication indicating that a time required for a cell measurement is relaxed; and
    a receiver configured to receive, from the UE, a measurement report including a measurement result of at least one cell measured based on the information, and
    wherein the information further includes a scaling factor for scaling the time.

2. The node B as in claim 1, wherein the information indicates for the UE to initiate a cell search for at least one frequency during an inactive time of a discontinuous reception (DRX) cycle.

3. The node B as in claim 1, wherein the information is transmitted based on at least one of a broadcast message and a radio resource control (RRC) connection reconfiguration message.

4. The node B as in claim 3, wherein the receiver is configured to receive a physical cell identity (PCI) of a cell among at least one searched cell and transmit information related to a measurement report event condition.

5. The node B as in claim 4, wherein the measurement report is received based on the measurement report event condition, and wherein the UE is handed over to the cell based on the measurement report.

6. A user equipment (UE) in a communication network, the UE comprising:
    a receiver configured to: receive, from a node B, information for cell re-selection including an indication indicating that a time required for a cell measurement is relaxed;
    a processor configured to measure at least one cell based on the information; and
    a transmitter configured to transmit, to the node B, a measurement report including a measured result,
    wherein the information further includes a scaling factor for scaling the time.

7. The UE as in claim 6, wherein the information indicates for the UE to initiate a cell search for at least one frequency during an inactive time of a discontinuous reception (DRX) cycle.

8. The UE as in claim 6, wherein the information is received based on at least one of a broadcast message and a radio resource control (RRC) connection reconfiguration message.

9. The UE as in claim 6, wherein the UE is configured to receive information related to a measurement report event condition, and
    wherein the measurement report is transmitted based on the measurement report event condition.

10. A method of a node B in a communication network, the method comprising:
    transmitting, to a user equipment (UE), information for cell re-selection including an indication indicating that a time required for a cell measurement is relaxed; and
    receiving, from the UE, a measurement report including a measurement result of at least one cell measured based on the information,
    wherein the information further includes a scaling factor for scaling the time.

11. The method as in claim 10, wherein the information indicates for the UE to initiate a cell search for at least one frequency during an inactive time of a discontinuous reception (DRX) cycle.

12. The method as in claim 10, wherein the information is transmitted based on at least one of a broadcast message and a radio resource control (RRC) connection reconfiguration message.

13. The method as in claim 12, further comprising: receiving a physical cell identity (PCI) of a cell among at least one searched cell; and transmitting information related to a measurement report event condition.

14. The method as in claim 13, wherein the measurement report is received based on the measurement report event condition, and
wherein the UE is handed over to the cell based on the measurement report.

15. A method of a user equipment (UE) in a communication network, the method comprising:
receiving, from a node B, information for cell re-selection including an indication indicating that a time required for a cell measurement is relaxed;
measuring at least one cell based on the information; and
transmitting, to the node B, a measurement report including a measured result,
wherein the information further includes a scaling factor for scaling the time.

16. The method as in claim 15, wherein the information indicates for the UE to initiate a cell search for at least one frequency during an inactive time of a discontinuous reception (DRX) cycle.

17. The method as in claim 15, wherein the information is received based on at least one of a broadcast message and a radio resource control (RRC) connection reconfiguration message.

18. The method as in claim 15, further comprising receiving information related to a measurement report event condition, and wherein the measurement report is transmitted based on the measurement report event condition.

* * * * *